May 8, 1951     C. C. BRADBURY     2,552,033
MASTER CYLINDER WITH TILTING VALVE
Filed Feb. 15, 1949

INVENTOR.
CLIFFORD C. BRADBURY
BY Guy M. Campbell
ATTORNEY

Patented May 8, 1951

2,552,033

UNITED STATES PATENT OFFICE 2,552,033

MASTER CYLINDER WITH TILTING VALVE

Clifford C. Bradbury, Richmond, Ind., assignor to Hydraulic Brake Company, Detroit, Mich., a corporation of California Application February 15, 1949, Serial No. 76,473

5 Claims. (Cl. 60—54.6)

My invention relates to master cylinders, and particularly to a combined master cylinder and reservoir and a valve mechanism for opening and closing a passageway between the cylinder and the reservoir.

The object of my invention is to provide a tilting valve which is tilted off its seat when the master cylinder piston is in its normal position, and which straightens on its seat to close the passageway between the cylinder and reservoir upon the first movement of the piston from its normal position, the valve mechanism being located at one side of the axis of the master cylinder so that upon the removal of the piston from the cylinder, the stem of the valve will be deflected laterally of the cylinder axis to permit the operating flange to pass the valve stem.

As a result of the construction of my invention permitting the piston to be removed or replaced without removing the valve and its housing from the opening between the cylinder and the reservoir, the valve and its housing may be inserted in the opening between the cylinder and the reservoir even when the piston is in its normal position, the valve stem under that circumstance being deflected laterally of the axis of the cylinder.

My invention is illustrated in the accompanying drawing, in which

Figure 2:
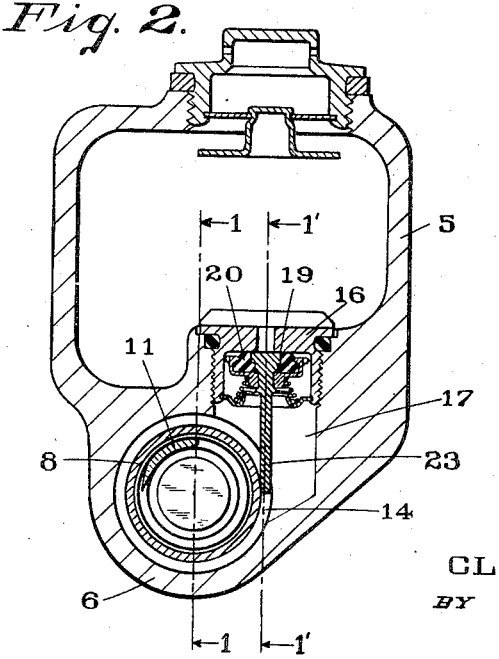
Fig. 2 is a vertical section taken on the line 2—2 of Fig. 1 but showing the piston in its partly actuated position, in which position the valve is seated.

The reservoir 5 is preferably integrally cast with and on top of the cylinder 6. A piston 8, having a packing 9, is reciprocably mounted in the cylinder and adapted to be moved in its pressure direction by a plunger 10 and returned to its normal position by a spring 11. The piston has a tubular extension 13 which carries a flange 14 at its end of a diameter substantially that of the bore of the cylinder 6. A valve housing 16 is threaded into an opening 17 between the cylinder and the reservoir, located beyond the pressure stroke of the packing 9. The opening 17 is positioned laterally of the axis of the piston as shown more clearly in Fig. 2 with the axis of the valve opening slightly within the cylinder bore. The valve housing 16 provides a seat 19 for a valve packing 20, preferably of yieldable rubber, contracted around a central valve head 21, and circumferentially engaged by a locking ring 22, which is attached to the valve stem 23, which extends into the cylinder 6 and terminates therein within the bore of the cylinder and substantially on the line of a horizontal plane through the cylinder axis.

A spider 25 forms a seat for a spring 26 which tends to hold the valve packing 20 against the seat 19. The end of the cylinder remote from the piston rod 10 is provided with a valve 28 forming no part of my invention, and which permits a substantially unretarded flow of brake fluid out of the cylinder, but retards the flow of brake fluid back into the cylinder, the retardation being provided by the pressure of the spring 11 on the valve mechanism 28.

Figure 1:
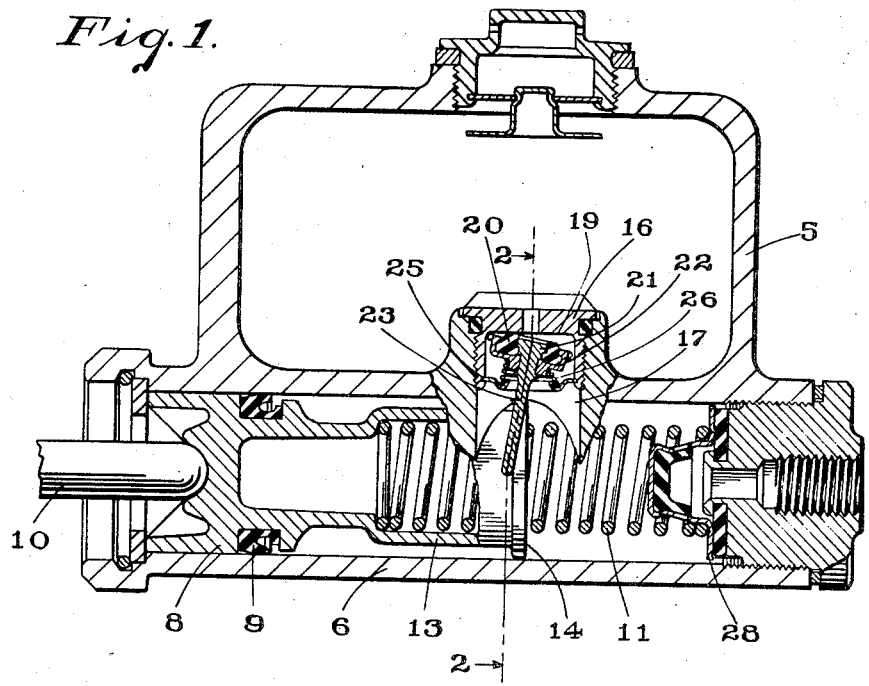
Fig. 1 is a vertical section through the cylinder, on the line 1—1 of Fig. 2, and of the reservoir and valve on the line 1'—1' of Fig. 2, but showing the valve tilted as it is when the piston is in its normal position. The section is taken on a plane which passes through the axis of the cylinder with the valve and filler cap sectioned through the axis of the valve.

In the normal operation of my invention, the valve stem 23 is normally deflected by the piston flange 14 so that a passageway is maintained through the central opening of the valve seat 19 and past the rubber packing 20 of the tilting valve. Upon the first pressure movement of the piston, the flange 14 moves with the packing 9 of the piston, permitting the valve stem 23 to straighten, and the rubber packing 20 to close upon the seat 19. This prevents fluid from passing from the cylinder into the reservoir, and with the further movement of the piston, pressure fluid is forced through the cylinder outlet to the wheel brake motors not shown. Upon the rapid return of the piston 8, under the influence of the spring 11, the valve packing 20 will be drawn away from the seat 19. When the piston 8 has returned to its normal position, shown in Fig. 1, the valve packing 20 will be moved off the seat 19 by the tilting of the valve stem 23, and such excess fluid as will now flow into the cylinder 6 from the wheel brake motors will pass into the reservoir through the now open tilted valve.

Figure 3:
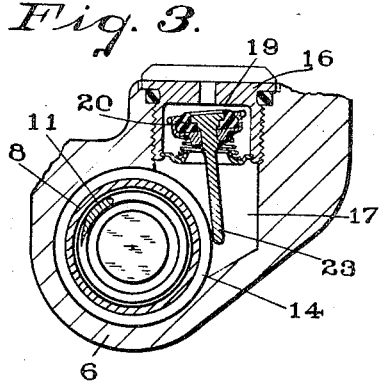
Fig. 3 is a section taken on the line 2—2 of Fig. 1 but showing the valve deflected laterally of the cylinder axis as it is when the piston is being either removed from or replaced in the cylinder.

Sometimes in service it becomes necessary to examine the packing on the master cylinder piston. On such an occasion, the piston 8 may be removed from the cylinder in the usual way, and as the flange 14 presses against the stem 23 of the tilting valve, the stem will be moved laterally, as shown in Fig. 3, out of the path of the flange 14. Upon the piston 8 being returned to the cylinder 6, the flange 14 will again deflect the valve stem 23 laterally, permitting the piston to be moved into the cylinder without first having removed the valve housing 16 from the opening 17.

If, instead of there being a necessity for removing the piston 8 from the cylinder, there is a necessity for removing the valve housing 16, this may be removed and replaced even with the piston and the flange 14 in their normal positions. Under this circumstance, when the valve housing 16 is screwed into the opening between the cylinder and reservoir, the end of the valve stem 23 engages the periphery of the flange 14, deflecting the valve stem laterally of the cylinder bore so that the valve is not injured by the replacement of the housing.

While I have shown and described my invention with respect to certain details of construction, it is to be understood that certain modifications may be made without departing from the spirit or scope of my invention.

I claim.

1. In a combined master cylinder and reservoir for vehicle brakes, the cylinder being positioned horizontally, with the reservoir cast integrally above it, a piston, a packing carried thereon movable in the cylinder, there being a vertical opening between the cylinder and the reservoir located laterally of the axis of the cylinder and cutting into the side wall thereof, a circumferential flange carried by the piston substantially filling the cylinder bore movable with the piston packing and normally positioned substantially centrally of the opening between the cylinder and the reservoir, a valve in said opening seating toward the reservoir having a stem extending into the cylinder for engagement by said flange for tilting the valve on its seat for opening it when the flange is in its normal position, the valve stem being movable laterally by the flange into the opening in the side wall of the cylinder when the piston with its packing and flange is removed from or replaced in the cylinder.

2. In a combined cylinder and reservoir, a piston, a packing carried thereon movable in the cylinder, there being an opening between the cylinder and the reservoir beyond the pressure stroke of the piston packing centered laterally of the axis of the cylinder and cutting into the side wall of the cylinder substantially to the level of the axis of the cylinder, a circumferential flange substantially filling the cylinder bore movable with the piston and its packing and normally positioned substantially centrally of the opening between the cylinder and the reservoir, a valve in said opening seating toward the reservoir having a stem extending into the cylinder for engagement by said flange for tilting the valve on its seat for opening it, the outer line of said valve stem being substantially tangent to the cylinder bore, the stem being engaged by the flange to slightly tilt the valve when the packing is in its normal position, the flange serving to move the stem laterally into the opening in the side wall of the cylinder when the piston with its packing and flange is removed from or returned to the cylinder.

3. In a hydraulic brake system, a master cylinder, a reservoir, a piston in the cylinder, there being an opening through the wall of the cylinder beyond the pressure stroke of the piston, the opening being on one side of the cylinder axis and extending into the side wall of the cylinder and downwardly to a depth substantially level with the axis of the cylinder, a valve in the opening seated away from the cylinder adapted to be opened by fluid pressure toward the cylinder or by tilting the valve on its seat, a spring tending to hold the valve on its seat, the valve having a stem extending into the cylinder with its outer edge substantially tangent with the cylinder wall, a circumferential flange movable with the piston having a face toward the piston normally positioned to engage the valve stem and tilt the valve, the further movement of the flange as when the piston is removed from the cylinder serving to move the valve stem laterally into the opening in the side wall of the cylinder so that the piston and flange may be removed without first removing the valve.

4. In a combined cylinder and reservoir, a piston in the cylinder, a valve seated toward the reservoir closing an opening between the cylinder and reservoir beyond the pressure stroke of the piston, the opening being at one side of the cylinder axis and extending into the side wall of the cylinder substantially to the level of the cylinder axis, a flange on the piston substantially filling the cylinder bore, the valve having a stem engageable by said flange to tilt the valve substantially axially of the cylinder upon the first engagement of the flange with the stem, and to tilt the valve laterally upon the further movement of the flange in the same direction to permit the flange to pass the valve stem.

5. In a combined cylinder and reservoir for hydraulic brakes, a valve closing a passageway between the cylinder and reservoir having a stem extending into the cylinder, means in the cylinder for tilting said stem and valve substantially axially of the cylinder to open the valve, the axis of said valve being positioned laterally of the axis of the cylinder, said means tilting said stem and valve laterally of the axis of the cylinder when the tilting means is moved past the valve as said tilting means is withdrawn from or replaced in the cylinder.

CLIFFORD C. BRADBURY.

REFERENCES CITED

The following references are of record in the file of this patent:

FOREIGN PATENTS

| Number | Country | Date |
|---|---|---|
| 539,095 | Great Britain | Aug. 27, 1941 |